(12) United States Patent
Rangayyan et al.

(10) Patent No.: US 11,563,555 B2
(45) Date of Patent: Jan. 24, 2023

(54) MANAGEMENT OF ENCRYPTION AGENTS IN DATA STORAGE SYSTEMS

(71) Applicant: THALES DIS CPL USA, INC., Austin, TX (US)

(72) Inventors: Vishnu Rangayyan, San Jose, CA (US); Masoud Sadrolashrafi, San Jose, CA (US); Peter Tsai, San Jose, CA (US)

(73) Assignee: THALES DIS CPL USA, INC., Austin, TX (US)

( * ) Notice: Subject to any disclaimer, the term of this patent is extended or adjusted under 35 U.S.C. 154(b) by 632 days.

(21) Appl. No.: 16/109,501

(22) Filed: Aug. 22, 2018

(65) Prior Publication Data

US 2019/0097789 A1 Mar. 28, 2019

Related U.S. Application Data

(60) Provisional application No. 62/563,540, filed on Sep. 26, 2017.

(51) Int. Cl.
| | | |
|---|---|---|
| H04L 29/06 | (2006.01) | |
| H04L 9/06 | (2006.01) | |
| G06F 21/62 | (2013.01) | |
| G06F 16/174 | (2019.01) | |
| H04L 9/08 | (2006.01) | |
| G06F 21/60 | (2013.01) | |
| G06F 21/80 | (2013.01) | |

(52) U.S. Cl.
CPC ........ *H04L 9/0618* (2013.01); *G06F 16/1748* (2019.01); *G06F 21/602* (2013.01); *G06F 21/6218* (2013.01); *G06F 21/80* (2013.01); *H04L 9/083* (2013.01); *H04L 9/0894* (2013.01)

(58) Field of Classification Search
CPC ..... H04L 9/0618; H04L 9/083; H04L 9/0894; G06F 21/602; G06F 21/6218; G06F 21/80; G06F 16/1748; G06F 21/606; G06F 21/79
USPC .......................................................... 713/189
See application file for complete search history.

(56) References Cited

U.S. PATENT DOCUMENTS

| | | | | |
|---|---|---|---|---|
| 5,761,301 | A * | 6/1998 | Oshima ................ | G11B 27/24 705/57 |
| 8,170,213 | B1 * | 5/2012 | Harwood ............. | H04L 9/0822 380/277 |
| 2003/0061499 | A1 * | 3/2003 | Durrant ................. | G06F 21/85 713/189 |
| 2003/0200548 | A1 * | 10/2003 | Baran ................ | H04N 21/2365 725/90 |
| 2005/0172154 | A1 * | 8/2005 | Short ................ | H04M 3/42017 726/5 |
| 2005/0226408 | A1 * | 10/2005 | Hotz ..................... | H04L 9/0662 380/28 |

(Continued)

*Primary Examiner* — John B King
(74) *Attorney, Agent, or Firm* — Marc Boillot—Thales DIS CPL USA, Inc (57) ABSTRACT

A method for managing keys and encrypting data is provided. The method includes receiving data to be written to a logical disk, generating an encryption table indicating one or more locations on the logical disk for storing the data and indicating a key used for encrypting the data, encrypting the data to be written to the logical disk, and transmitting the encrypted data and the encryption table to a storage array.

12 Claims, 7 Drawing Sheets

(56) References Cited

U.S. PATENT DOCUMENTS

| | | | |
|---|---|---|---|
| 2007/0143827 A1* | 6/2007 | Nicodemus | H04L 63/102 |
| | | | 726/2 |
| 2013/0044882 A1* | 2/2013 | Rich | H04L 9/0833 |
| | | | 380/279 |
| 2013/0117575 A1* | 5/2013 | Kataoka | H04L 9/16 |
| | | | 713/189 |
| 2015/0089218 A1* | 3/2015 | Overby | H04L 63/0457 |
| | | | 713/161 |
| 2015/0365232 A1* | 12/2015 | Yang | H04L 9/3231 |
| | | | 380/286 |

* cited by examiner

MANAGEMENT OF ENCRYPTION AGENTS IN DATA STORAGE SYSTEMS

BACKGROUND

Cyber-attacks continue to grow more sophisticated and persistent. To combat threats and keep data safe, information technology (IT) teams have to employ robust encryption, key management, and access controls. This is especially true for information held in storage environments, which can contain an organization's most vital assets. To secure storage, many organizations have been leveraging native encryption offerings from their storage vendors. The growing trend with "all flash" storage array deployments in enterprises pose particular challenges when encrypted data from host servers are stored in these arrays. Flash storage arrays offer high performance and capabilities like compression and de-duplication for storage efficiency. With sophisticated encryption algorithms that extend beyond simple substitution ciphers, encrypted data tends not to compress as much, and tends to not yield as much reduction in storage, as when deduplication and/or compression are applied to unencrypted data. Many storage systems are available with deduplication and/or compression, for example in network attached storage (NAS or SAN). Yet, to supply unencrypted or plaintext data over a network to such a storage system is risky, and can result in a security breach. It is within this context that the embodiments arise.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

As discussed above, unencrypted data tends not to compress as much, and tends to not yield as much reduction in storage, as when deduplication and/or compression are applied to unencrypted data. Many storage systems are available with deduplication and/or compression, for example in network attached storage (NAS or SAN). Yet, to supply unencrypted or plaintext data over a network to such a storage system is risky, and can result in a security breach. It may be useful if the storage array and the host system can coordinate and/or synchronize the encryption/decryption of data to allow the storage array to decrypt the data received from the host, prior to applying de-duplication and compression logic to the data. This may allow for better deduplication and/or compression of data while maintaining the encryption of the data during its transmission between the host system and a storage array.

Figure 1:
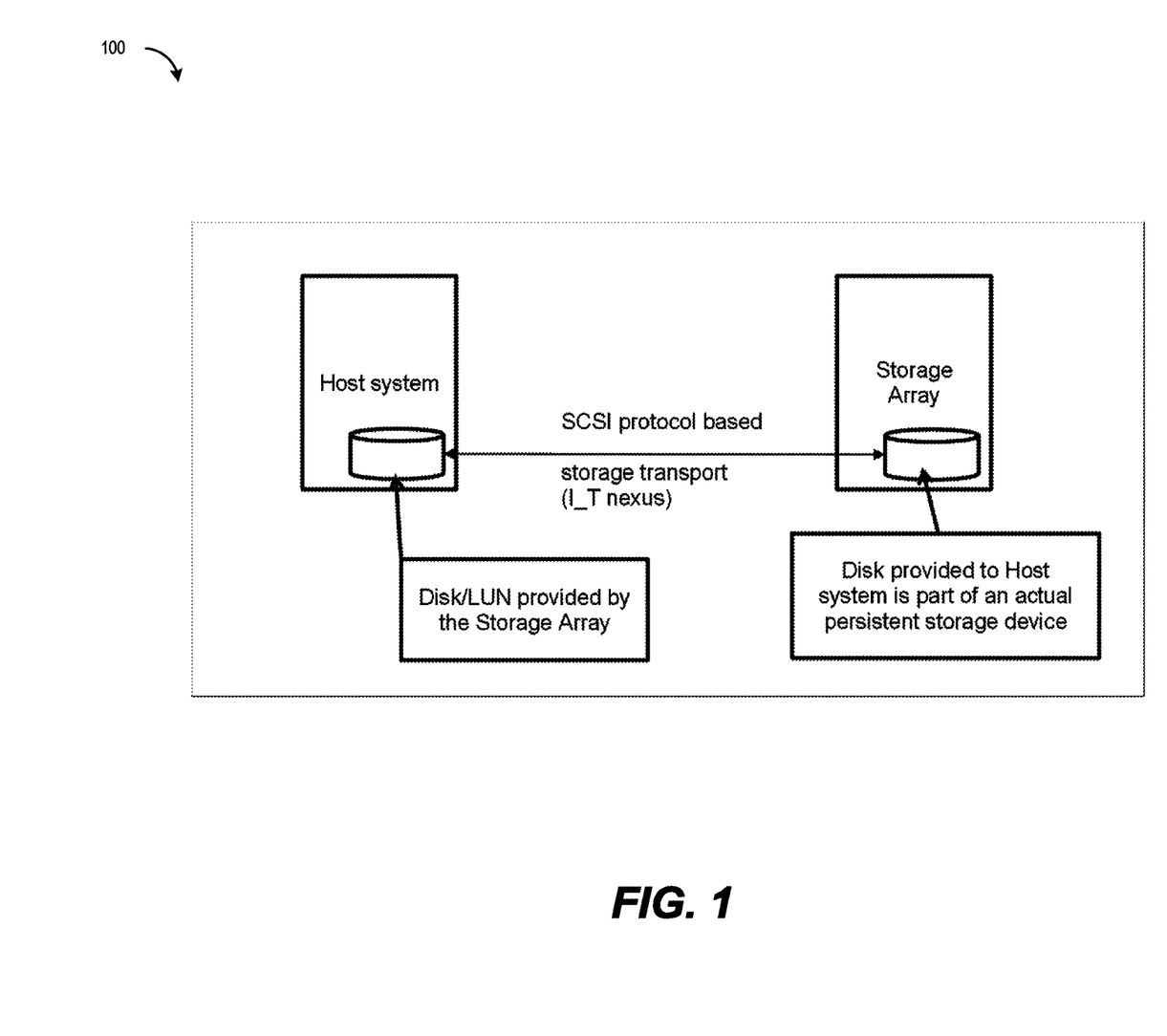
FIG. 1 is a diagram illustrating an example storage system, in accordance with some embodiments of the present disclosure.

FIG. 1 is a diagram illustrating an example storage system 100, in accordance with some embodiments of the present disclosure. The storage system 100 includes a host system and a storage array. The storage system and the storage array may be communicatively coupled via a network (not shown in FIG. 1). The network may be a public network (e.g., the internet), a private network (e.g., a local area network (LAN) or wide area network (WAN)), or a combination thereof. In one embodiment, the network may include a wired or a wireless infrastructure, which may be provided by one or more wireless communications systems, such as a wireless fidelity (WiFi) hotspot connected with the network and/or a wireless carrier system that can be implemented using various data processing equipment, communication towers (e.g. cell towers), etc. The storage array includes one or more persistent or physical storage devices (e.g., one or more data storage devices such as hard disk drives (HDDs), solid-state drives (SSDs), etc.). The storage array may provide the persistent storage devices to the host system as a logical disk which may be identified using a logical unit number (LUN). The host system includes the logical disk or LUN provided by the storage array. In some embodiments, logical disk may be referred to as the LUN. The logical disk or LUN may be an individually addressable (logical) storage device that is part of (or mapped to) a persistent or physical storage device on the storage array.

The host system and the storage array may communicate data (e.g., transmit data, receive data, etc.) using various communication protocols/standards. For example, the host system and the storage array may communicate using the Small Computer System Interface (SCSI) standard over various different types of transport protocols. Examples of transport protocols include, but are not limited to, the Internet SCSI (iSCSI) over transmission control protocol/internet protocol (TCP/IP), Fibre Channel, serial attached SCSI (SAS), etc. The communication channel (established over the transport protocols) between the host system and the storage array may be referred to as a SCSI channel, a SCSI connection, or a SCSI communication channel. In some embodiments, the SCSI connection between the host system and the storage array may be referred to as an I_T nexus, where I may refer to an initiator (e.g., a device or a client that sends commands/requests) and where T may refer to a target (e.g., a device that receives and processes/executes the commands/requests).

In some embodiments, the mode of communication (between the host system and the storage array) for discovering, reading, and/or writing to disks may be defined by the SCSI protocol. For example, the commands, messages, requests, and/or responses as defined in the SCSI Architecture Model (SAM) standard, SCSI Primary Commands (SPC) standard, and/or the SCSI Block Commands (SBC) standard, may be used by the host system to discover disks (e.g., logical disks) that are provided by the storage array. In another example, the commands, requests, messages, and/or responses as defined in the SAM, SPC, and/or SBC standards may be used by the host system to read data from a logical disk and may be used by the storage array to transfer data from the physical or persistent storage device (which maps to the logical disk) to the host system.

Although the present disclosure may refer to SCSI or SCSI commands, other embodiments may use other types of standards that are used by storage devices. For example, in other embodiments, non-volatile memory express (NVMe) commands may be used instead of SCSI commands.

Figure 2:
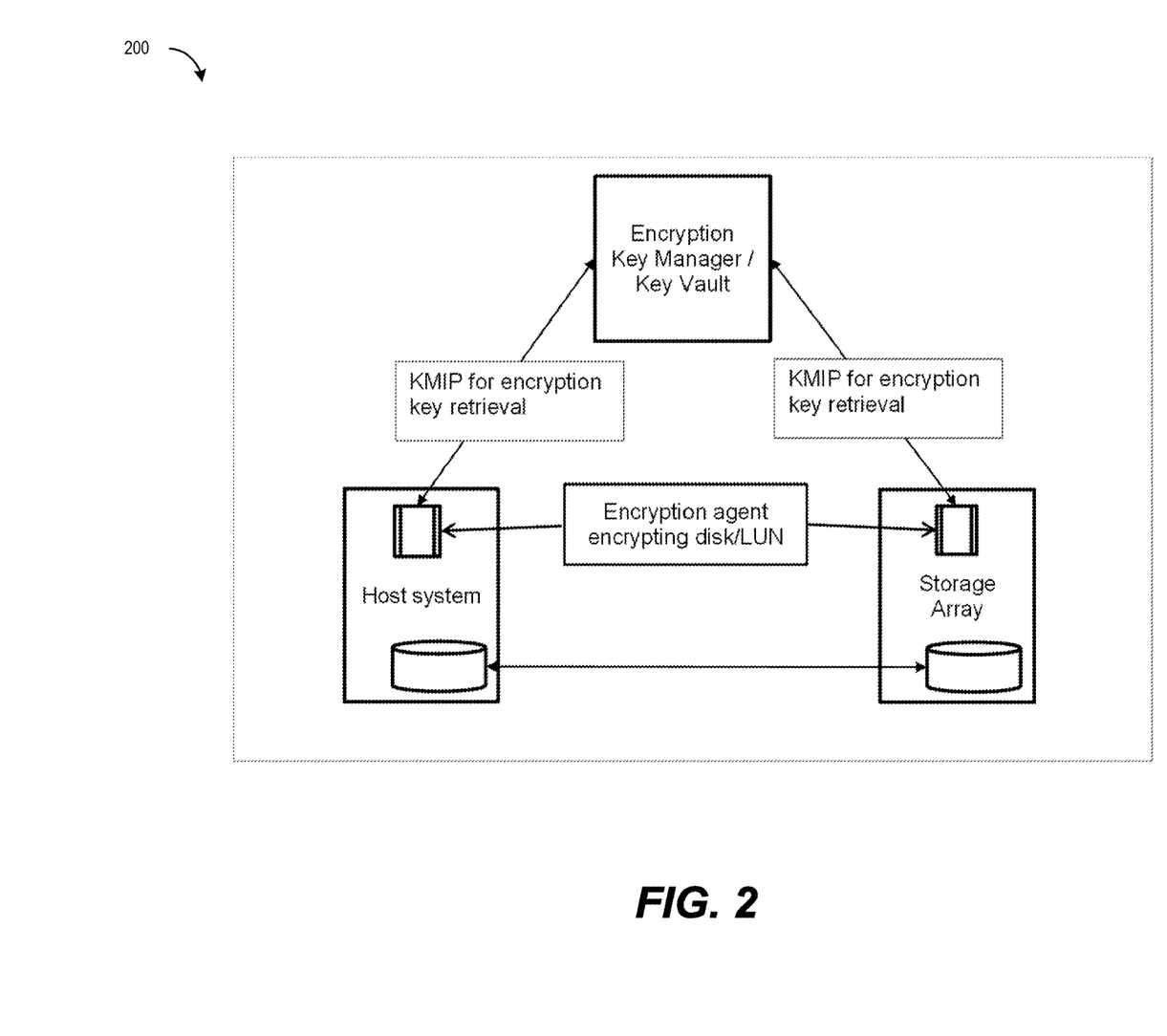
FIG. 2 is a diagram illustrating an example storage system, in accordance with some embodiments of the present disclosure.

FIG. 2 is a diagram illustrating a storage system 200, in accordance with some embodiments of the present disclosure. The storage system 200 includes a host system and a storage array. The storage system and the storage array may be communicatively coupled via a network (not shown in FIG. 2), as discussed above. The storage array includes one or more persistent or physical storage devices (e.g., one or more HDDs, SSDs, etc.). The storage array may provide the persistent storage devices to the host system as a logical disk which may be identified using a logical unit number (LUN). The host system includes the logical disk or LUN provided by the storage array. The logical disk or LUN may be an individually addressable (logical) storage device that is part of (or mapped to) a persistent or physical storage device on the storage array.

The host system and the storage array may communicate data using various communication protocols/standards. For example, the host system and the storage array may communicate using the iSCSI standard over TCP/IP, Fibre Channel, SAS, etc. The communication channel (established over the transport protocols) between the host system and the storage array may be referred to as a SCSI channel, a SCSI connection, or a SCSI communication channel. In other embodiments, other communication channels/connections may be used (e.g., NVME over Fibre Channel).

The host system includes an encryption agent (e.g., module or component) that encrypts and/or decrypts data. For example, the encryption agent of the host system may encrypt data before sending the data to the storage array (for storage on the physical or persistent devices) via the network. The storage array also includes an encryption agent (e.g., module or component) that encrypts and/or decrypts data. For example, the encryption agent of the storage array may decrypt the (encrypted) data received from the host system and may perform deduplication (e.g., identifying duplicate blocks/pages of data and storing one copy of the duplicate blocks/pages) and/or compression on the data before storing the data on the physical or persistent storage device. The encryption agent of the storage array may also encrypt the data after deduplication/compression.

The encryption and/or decryption of data may be performed using keys (e.g., cryptographic keys). The keys used by the encryption agents (to encrypt/decrypt data) may be stored and/or managed by the encryption key manager/key vault. The encryption key manager/key vault may be a computing device, such as a server computer, that stores and/or manages the keys. The encryption key manager/key vault may provide the keys to the host system and the storage array, and may synchronize the keys that are used by the host system and the storage array. For example, the encryption key manager/key vault may coordinate with the encryption agents on the host system and the storage array so that the same symmetric key that is used by one encryption agent (to encrypt data) is also used by another encryption agent (to decrypt data). In another example, the encryption key manager/key vault may coordinate with the encryption agents on the host system and the storage array so that the same public/private key pair is used by the encryption agents. In some embodiments, the encryption key manager/key vault, the host system, and/or the storage array may use the key management interoperability protocol (KMIP) to manage the keys used by the encryption agents on the host system and the storage array. For example, the encryption key manager/key vault may use KMIP to change or transmit the keys used by the host system and the storage array.

In some embodiments, the encryption agents on host system that encrypt data stored on a logical disk or LUN provided by a storage array may cause various side effects. For example, a storage array may receive data from the host and may process the data further prior to storing it on the persistent disk (which is mapped to the logical disk/LUN). The processing may involve de-duplication where the storage array may identify one or more duplicate blocks/pages of data and may store one copy of the duplicate blocks/pages. The processing may also involve compressing the data to reduce the amount of storage space used to store the data. The storage array may also encrypt the data before writing it to the physical or persistent storage device (e.g., an HDD, an SSD).

The de-duplication and/or compression of data may be affected (e.g., hampered) when the data is encrypted by the host system prior to sending it to the storage array. For example, if the storage array receives encrypted data, the storage array may not be able to de-duplicate and/or compress the data as effectively when compared to the unencrypted data (e.g., encrypted data may result in less de-duplication and/or less compression when compared to unencrypted data). It may be useful to allow the storage array and the host system to coordinate and/or synchronize the encryption/decryption of data to allow the storage array to decrypt the data received from the host prior to applying de-duplication and compression logic to the data. This may allow for better/more efficient de-duplication and/or compression while maintaining the security of the data by transmitting/receiving the data between the host system and the storage array while it is still encrypted.

Figure 3:
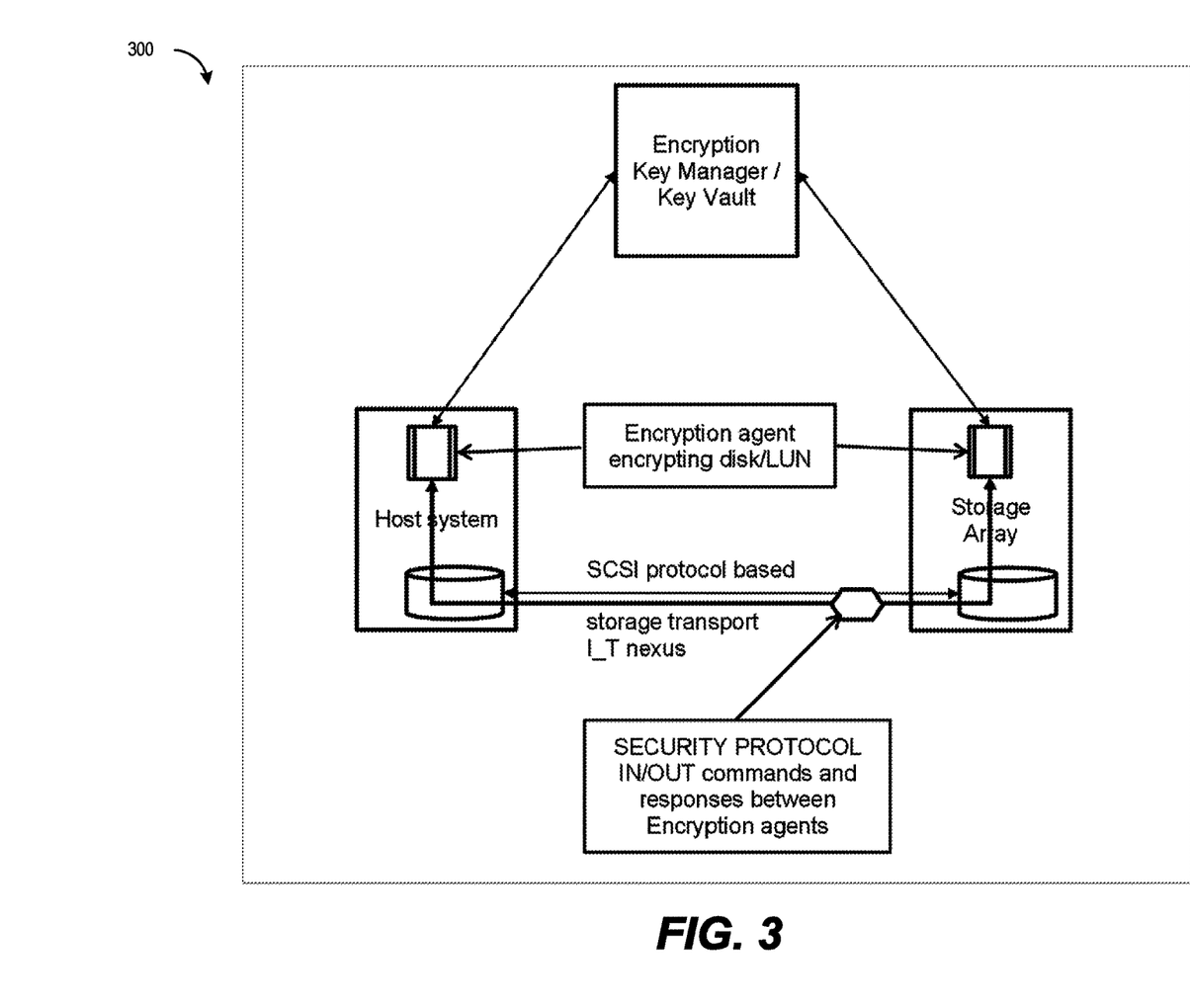
FIG. 3 is a diagram illustrating an example storage system, in accordance with some embodiments of the present disclosure.

The examples, implementations, and/or embodiments described herein may allow the host system and the storage array to agree on the keys or key pairs that should be used to encrypt/decrypt data. The examples, implementations, and/or embodiments described herein may also allow unencrypted logical disks/LUNs to be encrypted. The examples, implementations, and/or embodiments described herein may further allow the keys/key pairs which are used by the host system and the storage array to be rotated or changed. The examples, implementations, and/or embodiments described herein may also allow the host encryption agent to coordinate its activation/deactivation with the storage array to safeguard the logical disk/LUN from being tampered with prior to the activation of the host system encryption agent FIG. 3 is a diagram illustrating a storage system 300, in accordance with some embodiments of the present disclosure. The storage system 300 includes a host system and a storage array. The storage system and the storage array may be communicatively coupled via a network (not shown in FIG. 3), as discussed above. The storage array includes one or more persistent or physical storage devices (e.g., one or more HDDs, SSDs, etc.). The storage array may provide the persistent storage devices to the host system as a logical disk which may be identified using a logical unit number (LUN). The host system includes the logical disk or LUN provided by the storage array. The logical disk or LUN may be an individually addressable (logical) storage device that is part of (or mapped to) a persistent or physical storage device on the storage array.

The host system and the storage array may communicate data using various communication protocols/standards. For example, the host system and the storage array may communicate using the iSCSI standard over TCP/IP, Fibre Channel, SAS, etc. The communication channel (established over the transport protocols) between the host system and the storage array may be referred to as a SCSI channel, a SCSI connection, or a SCSI communication channel. In some embodiments, the SCSI connection between the host system and the storage array may be referred to as an I_T nexus, where I may refer to an initiator (e.g., a device or a client that sends commands/requests) and where T may refer to a target (e.g., a device that receives and processes/executes the commands/requests). Although a SCSI channel is illustrated in FIG. 3, other communication channels/connections may be used (e.g., NVME over Fibre Channel) may be used in other embodiments.

The host system includes an encryption agent (e.g., module or component) that encrypts and/or decrypts data, as discussed above. The storage array also includes an encryption agent (e.g., module or component) that encrypts and/or descripts data, as discussed above. The encryption and/or decryption of data may be performed using keys (e.g., cryptographic keys). The keys used by the encryption agents (to encrypt/decrypt data) may be stored and/or managed by the encryption key manager/key vault, as discussed above. The encryption key manager/key vault may provide the keys to the host system and the storage array and may synchronize/coordinate the keys that are used by the host system and the storage array, as discussed above. The encryption key manager/key vault, the host system, and/or the storage array may use the key management interoperability protocol (KMIP) to manage the keys used by the encryption agents on the host system and the storage array, as discussed above.

As discussed above, the de-duplication and/or compression of data may be affected (e.g., hampered) when the data is encrypted by the host system prior to sending it to the storage array. The storage system 300 may use the encryption key manager/key vault and/or various SCSI commands (discussed in more detail below) to allow the encryption agents (of the host system and the storage array) to coordinate the encryption and/or decryption of data to allow for better de-duplication/compression of the data (e.g., to allow the data to be de-duplicated and/or compressed more efficiently).

In one embodiment, the storage system 300 may use SCSI SPC-4 SECURITY PROTOCOL IN command and the SCSI SPC-4 SECURITY PROTOCOL OUT command (referred to collectively as SECURITY PROTOCOL IN/OUT commands) to coordinate or synchronize the encryption/decryption of data. For example, the SECURITY PROTOCOL IN/OUT commands may be used to query and/or provide information between the host system and the storage array, to determine the state of the encryption agent (e.g., whether the encryption agent is encrypting data), to issue control commands, etc.

In one embodiment, the SECURITY PROTOCOL IN/OUT commands may be used to notify the storage array when the encryption agent of the host system begins processing input/output (e.g., begins writing data) to the logical disk/LUN. For example, the encryption agent of the host system may transmit data (e.g., an encryption start marker/indicator/value) indicating that the encryption agent of the host system is active/activated and that encryption has started for an I/O stream for a range or set of blocks of the logical disk/LUN, using the SECURITY PROTOCOL IN/OUT commands. The write commands and/or requests (to an encrypted disk/LUN) received prior to the encryption agent being activated may be blocked since they may tamper with (e.g., overwrite) the encrypted data. The read commands and/or requests may be allowed because the data that is returned may be encrypted data and may not be usable without decrypting the data. Read commands and/or requests may also be blocked prior to the host encryption agent activation to prevent cryptanalysis of the encrypted data.

In one embodiment, the SECURITY PROTOCOL IN/OUT commands may be used to query and/or exchange an encryption map for a logical disk/LUN. The encryption map may include tuples that include one or more of a key identifier (an opaque key identifier that does not provide information about the key that is identified), a start offset, a length (of the data), a cipher (that is used to encrypt the data), and an initial vector. The encryption map is discussed in more detail below.

In one embodiment, the SECURITY PROTOCOL IN/OUT commands may be used to notify the storage array when the host encryption agent is deactivated and/or stops processing I/O (e.g., stops writing data) to the disk/LUN. For example, the encryption agent of the host system may transmit data (e.g., an encryption stop marker/indicator/value) indicating that the encryption agent of the host system is inactive/deactivated and that encryption has stopped for an I/O stream for a range or set of blocks of the logical disk/LUN, using the SECURITY PROTOCOL IN/OUT commands. Write commands/requests to the encrypted disk/LUN after the encryption agent is deactivated may be blocked since they may tamper with encrypted data on the disk. Read commands/requests after the encryption agent may also be blocked, as discussed above.

In some embodiments, the data storage system 300 may use KMIP to transmit/receive the encryption map (or portions of the encryption map) and/or to coordinate the encryption/decryption of data between the host system and the storage array. For example, instead of using the SECURITY PROTOCOL IN/OUT commands, the host system, the storage array, and the key manager may use the KMIP protocol/standard to communicate the encryption map (or portions of the encryption map) and/or to indicate when the encryption agent of the host system shall begin or terminate using the key to encrypt data and/or write data to the logical disk/LUN or to a partition on the logical disk/LUN, as discussed in more detail below. A custom attribute and/or attribute value of the KMIP protocol/standard may be used, as discussed in more detail below.

As discussed above, the encryption map may include tuples that include one or more of a key identifier, a start offset, a length, a cipher, an initial vector, and an I/O direction. In some embodiments, the storage system 300 may use one encryption map per logical disk/LUN (provided by the storage array to the host system). In other embodiments, an encryption map may be shared for multiple logical disks/LUNs. The encryption map may be represented as a table. Table 1 (below) illustrates a table representation of an example encryption map.

TABLE 1

| Opaque Key ID | Start sector | Length (disk sector) | Cipher spec | Initial Vector (IV) | I/O Direction |
|---|---|---|---|---|---|
| sda1_key_LUN_WWN | 0 | 31 | None | None | Read + Write |
| sda2_key_LUN_WWN | 32 | 2047 | aes-cbc-256 | <16-byte value> | Write |
| sda3_key_LUN_WWN | 2048 | 4095 | aes-xts-512 | None | Read + Write |
| sda4_key_LUN_WWN | 4096 | 10000 | aes-xts-512 | None | Read |

In one embodiment, each row/entry of Table 1 may represent an I/O stream (e.g., read and/or write accesses/commands to read/write data to a logical disk/LUN). In other embodiments, an I/O stream may include multiple row of Table 1 (e.g., may include all of the accesses/commands represented by the rows of Table 1). The first column of Table 1 indicates a key identifier (e.g., an alphanumeric value) for an encryption key provided by the encryption key manager/key vault for an I/O stream. In other embodiments, the first column of Table may include the encryption key itself, which is used for an I/O stream. The second column of Table 1 may indicate the start offset in the logical disk/LUN for an I/O stream. For example, the first row may indicate that the I/O stream (represented by the first row) will start accessing data at an offset 0 (e.g., at sector 0, page 0, block 0, etc.) of the logical disk/LUN.

The third column of Table 1 may represent the length of an I/O stream (e.g., the amount of data to be accessed). For example, the second row may indicate that the length/size of the I/O stream (represented by the second row) is 2047 sectors long. The length of the I/O stream may be indicated using other units, such as pages, blocks, bytes, kilobytes, megabytes, gigabytes, etc. The fourth column of Table 1 may represent the encryption cipher that is used for an I/O stream. The encryption cipher may also be referred to as an encryption algorithm, an encryption hash, a hash, a hashing algorithm, etc. An alphanumeric value may be used to identify the different encryption ciphers that may be used. The format of the alphanumeric value may be agreed upon between the host system and the storage array.

The fifth column of Table 1 may represent an initial vector (e.g., an initialization vector, a seed, etc.) that may be used by the encryption cipher used for an I/O stream. For example, the second row indicates that a 16-byte value may be used as an initial vector for the advanced encryption standard (AES) 256-bit encryption cipher/algorithm. The initial vector may be optional in some embodiments. The sixth column of Table 1 may represent the direction of the I/O stream. For example, the second row indicates that the I/O stream (represented by the second row) is writing data from the host system to the storage array. In another example, the third row indicates that the I/O stream (represented by the third row) is reading data from the storage array to the host system and is writing data from the host system to the storage array. The direction of the I/O stream may be used when the data on a logical disk/LUN is being transformed from unencrypted data (e.g., clear data) to encrypted data, when the data on a logical disk/LUN is being transformed from encrypted data to unencrypted data (e.g., clear data), and/or when the encryption key (used to encrypt/decrypt data) is being changed/rotated. Indicating the direction of the I/O stream may allow different keys to be used for I/O being written (to the storage array) and I/O being read (from the storage array).

In some embodiments, the encryption map (e.g., illustrated in Table 1) may be provided by the host system to the storage array using the SCSI SECURITY PROTOCOL OUT (SPOUT) command with the encryption map as the payload or associated data, and may be requested by the host system from the storage array using the SECURITY PROTOCOL IN (SPIN) command. In other embodiments, the encryption map (e.g., illustrated in Table 1) may be provided by the storage array to the host system using the SPOUT command with the encryption map as the payload or associated data, and may be requested by the storage array from the host system using the SPIN command. In other embodiments, the encryption map (or portions of the encryption map) may be provided by the encryption key manager/key value to the host system and the storage array using KMIP messages and/or attributes, as discussed in more detail below.

Figure 4:
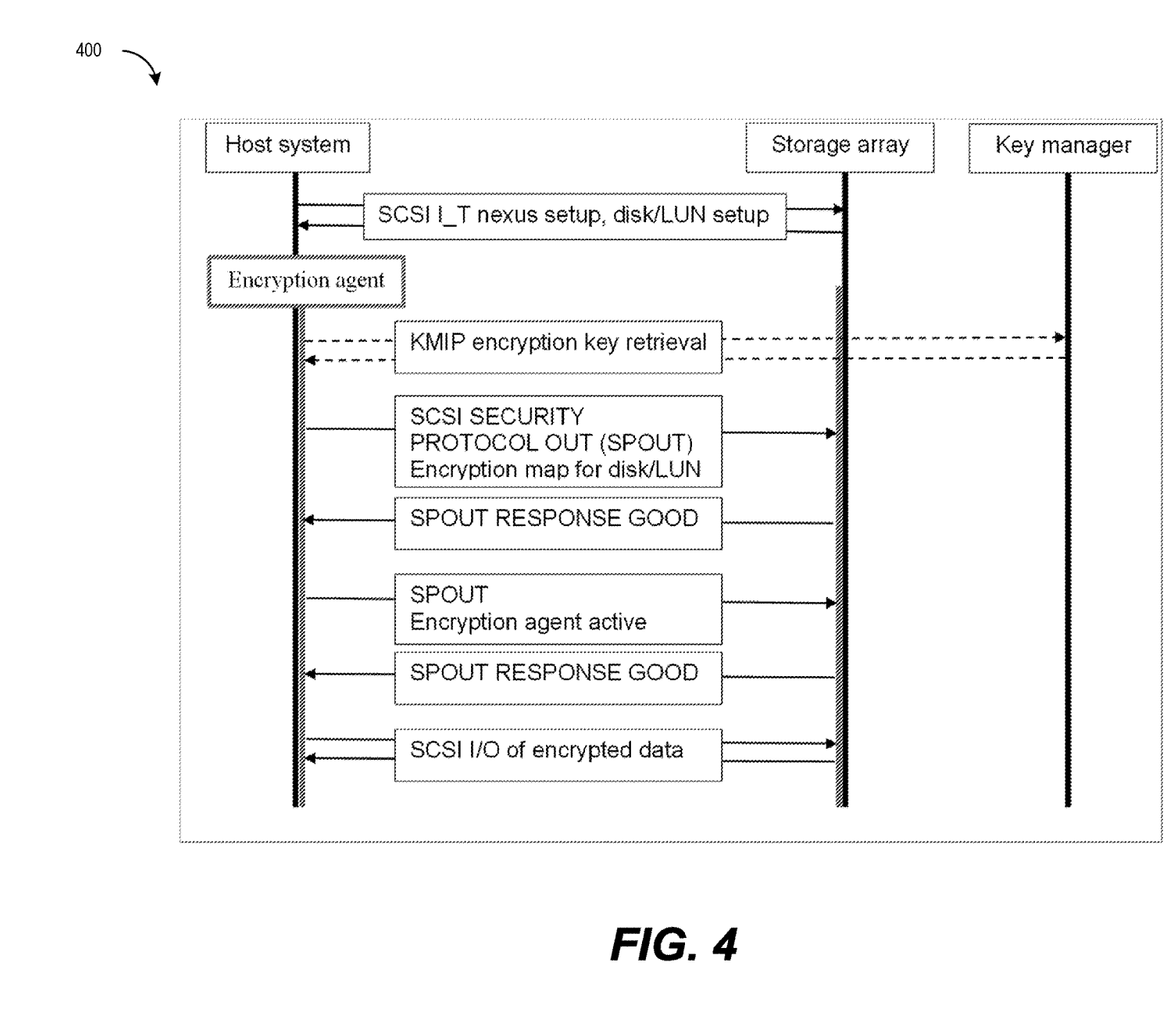
FIG. 4 illustrates a sequence diagram, in accordance with some embodiments of the present disclosure.

FIG. 4 illustrates a sequence diagram 400, in accordance with some embodiments of the present disclosure. The sequence diagram 400 includes a host system, a storage array, and a key manager (e.g., the encryption key manager/key vault illustrated in FIGS. 1-3). The host system may include an encryption agent and the storage array may include an encryption agent. The sequence diagram includes messages/interactions from the perspective of a host system. The interactions/messages illustrated in FIG. 4 may be performed by the host system SCSI layer and the encryption agent on the host system to setup access to a disk with encryption of the data occurring on the host system. Interactions/messages between the storage array and key manager are not depicted in FIG. 4 for simplicity.

The host system may communicate with the storage array (e.g., may send SCSI commands) to setup a SCSI I_T nexus (e.g., a SCSI channel/connection) between the host system and the storage array. The SCSI I_T nexus may be used for I/O streams (e.g., reading data, writing data, etc.) between the host system and the storage array. The encryption agent of the host system may communicate with the key manager (e.g., may transmit/receive messages, frames, packets, etc.) to retrieve one or more keys that are to be used for one or more I/O streams. As discussed above, the retrieval of the keys may be performed using the KMIP standard/protocol (or any other suitable protocol/standard that may be used to manage keys).

The encryption agent may send a SPOUT command that includes an encryption map for the I/O streams. For example, the encryption map may be included as the payload or associated data for the SPOUT command. The storage array (e.g., the encryption agent of the storage array) may transmit an SPOUT RESPONSE GOOD message indicating that the encryption map was received by the storage array. The encryption agent of the host system may transmit a SPOUT command with data (e.g., an encryption start marker, indicator, value, etc.) indicating that the encryption agent is now active and/or that the encryption agent will begin sending encrypted data in the I/O stream. The storage array (e.g., the encryption agent of the storage array) may transmit an SPOUT RESPONSE GOOD message indicating the storage array is now aware that the encryption agent of the host system is now active. After the second SPOUT RESPONSE GOOD message is received by the host system, the host system and the storage array may begin SCSI I/O of encrypted data. For example, the host system may begin transmitting encrypted data to the storage array, and the storage array may decrypt the data and de-duplicate/compress the data before storing the data.

Transmitting the encryption table and/or the encryption start marker using the SPOUT command may be referred to as transmitting information in-band. For example, transmitting the encryption map in the same communication channel (e.g., the same SCSI channel/connection) that is used for the I/O access or I/O stream may be referred to as transmitting the encryption table in-band.

Figure 5:
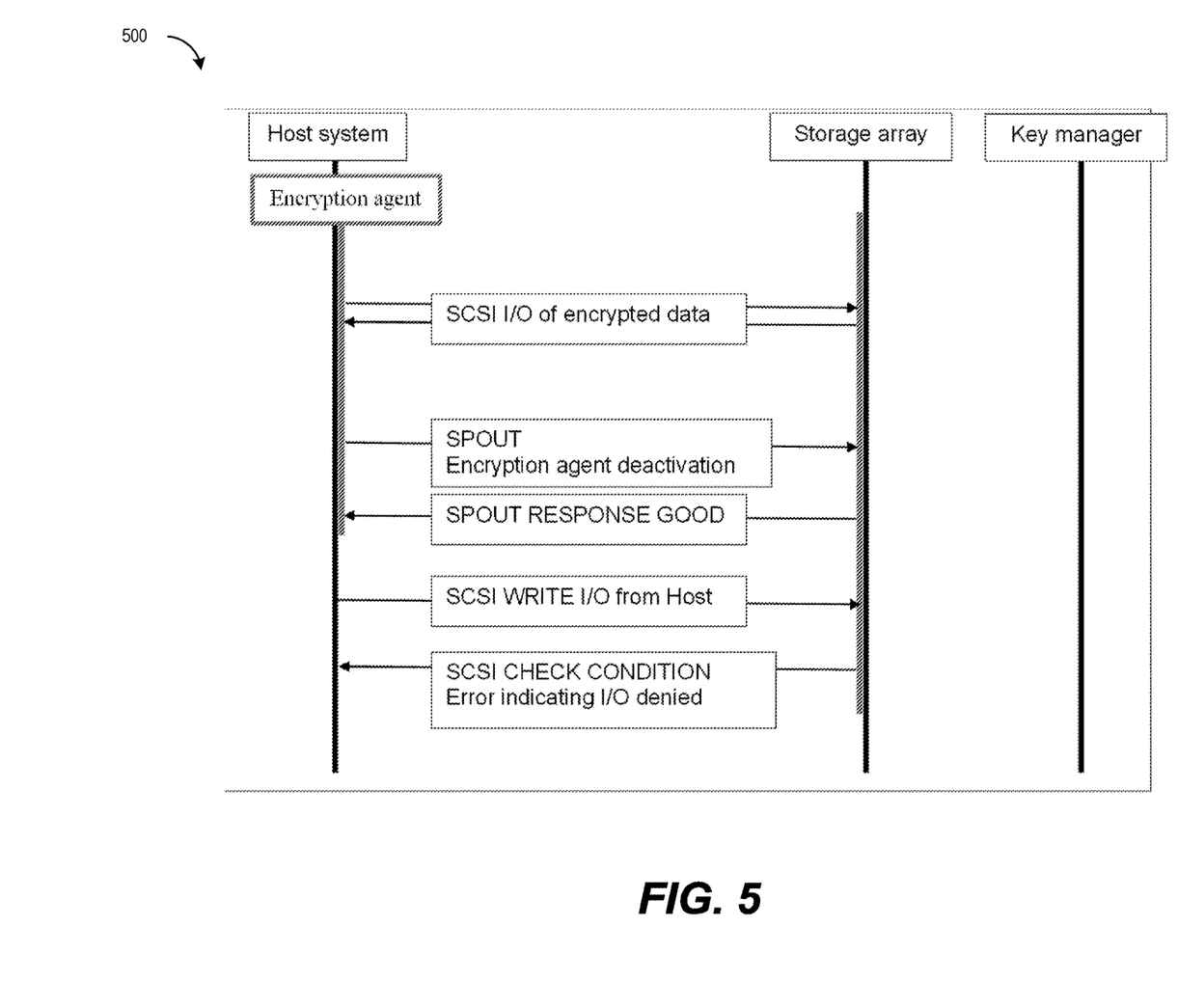
FIG. 5 illustrates a sequence diagram, in accordance with some embodiments of the present disclosure.

FIG. 5 illustrates a sequence diagram 500, in accordance with some embodiments of the present disclosure. The sequence diagram 500 includes a host system, a storage array, and a key manager (e.g., the encryption key manager/key vault illustrated in FIGS. 1-3). The host system may include an encryption agent and the storage array may include an encryption agent. The interactions/messages illustrated in FIG. 5 may be performed by the host system SCSI layer and the encryption agent on the host system to indicate that the encryption agent for the host system will deactivate for a logical disk/LUN.

As discussed above, the host system and the storage array may perform SCSI I/O of encrypted data. For example, the host system may transmit (e.g., write) and/or receive (e.g., read) encrypted data to/from the storage array using one or more I/O streams. The host system may communicate with the storage array (e.g., may send SCSI commands) via a SCSI I_T nexus (e.g., a SCSI channel/connection) between the host system and the storage array, as discussed above. The SCSI I_T nexus may be used for I/O streams (e.g., reading data, writing data, etc.) between the host system and the storage array.

The encryption agent of the host system may transmit a SPOUT command with data (e.g., an encryption stop/end marker, indicator, value, etc.) indicating that the encryption agent is deactivated/inactive and/or that the encryption agent will stop sending encrypted data in the I/O stream. The storage array (e.g., the encryption agent of the storage array) may transmit an SPOUT RESPONSE GOOD message indicating the storage array is now aware that the encryption agent of the host system is now inactive/deactivated. After the SPOUT RESPONSE GOOD message is received by the host system, the host system may attempt to write additional data to the storage array. For example, the host system may attempt to write an I/O stream (e.g., data) via the SCSI I_T nexus. The storage array may not write the data to the physical or persistent storage device and may transmit a SCSI CHECK CONDITION message with an error message/value indicating that the I/O was denied or was not performed. The storage array may not write the data to protect the integrity of data stored on the encrypted physical or persistent storage device, and to prevent accidental or malicious accesses of data stored on the storage array.

Transmitting the encryption stop/end marker using the SPOUT command may be referred to as transmitting the encryption stop/end marker in-band. For example, transmitting the encryption stop/end marker in-band may refer to transmitting the encryption stop/end marker in the same communication channel (e.g., the same SCSI channel/connection) that is used for the I/O access or I/O stream.

Figure 6:
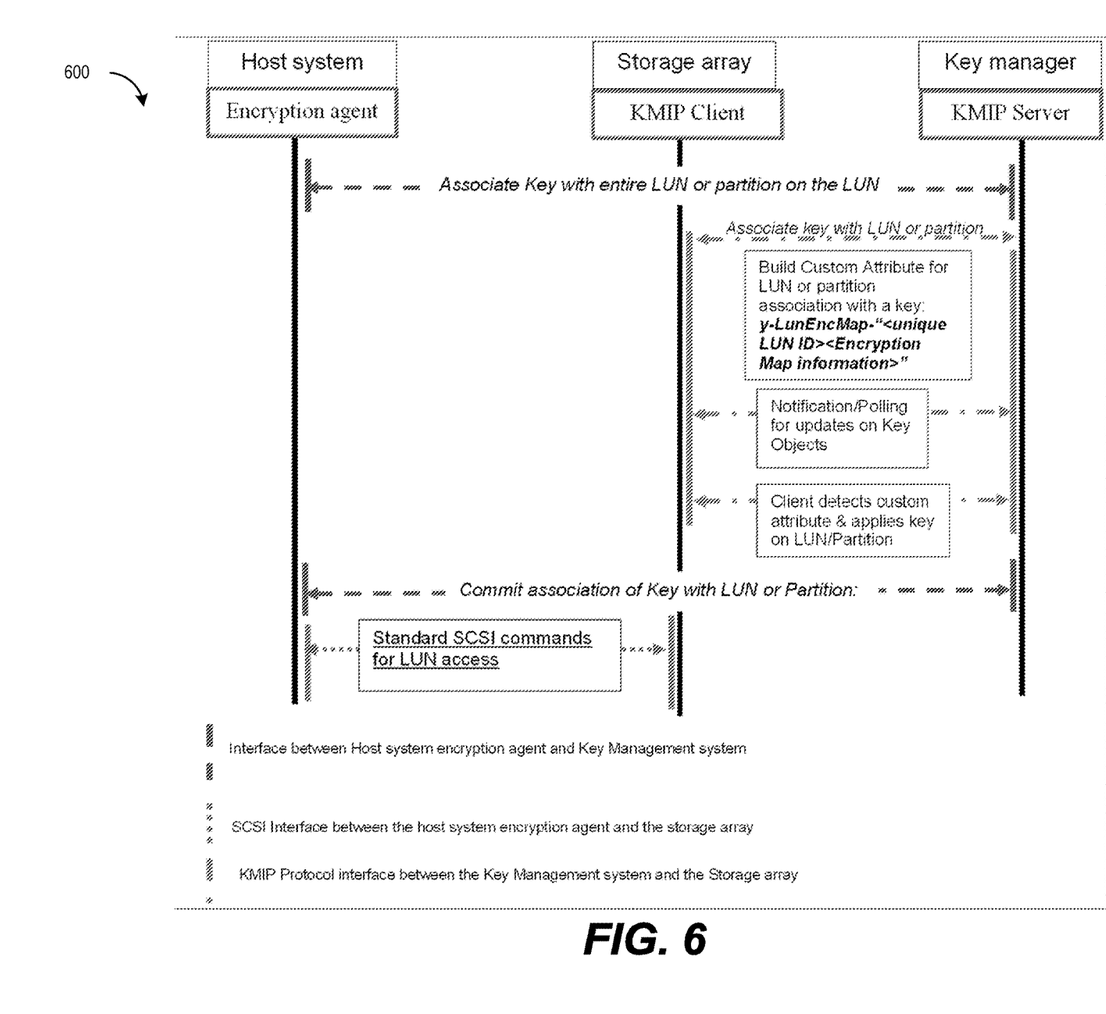
FIG. 6 illustrates a sequence diagram, in accordance with some embodiments of the present disclosure.

FIG. 6 illustrates a sequence diagram 600, in accordance with some embodiments of the present disclosure. The sequence diagram 600 includes a host system, a storage array, and a key manager (e.g., the encryption key manager/key vault illustrated in FIGS. 1-3). The host system includes an encryption agent, the storage array includes a KMIP client, and the key management may include a KMIP server. The interactions/messages illustrated in FIG. 6 may be performed by the host system SCSI layer and the encryption agent on the host system to exchange an encryption map and/or to indicate that the host system will write encrypted data to the storage array.

In one embodiment, the message/interactions allow a host system and the storage array to exchange the encryption map and/or to indicate that the host system will write encrypted data to the storage array, using the KMIP protocol/standard. The host system and the storage array may interact/communicate indirectly through the key manager to associate/obtain keys for a logical disk/LUN. The key manager may act as KMIP server, the storage array may act as a KMIP client, and the host system encryption agent may act as another KMIP client. In one embodiment, the host system encryption agent may interact with the key manager (e.g., the KMIP server) through a proprietary interface. This may allow the host system and the storage array to exchange encryption maps and/or to indicate that encrypted data with a specific key is going to be written to the storage array, without using SCSI SECURITY PROTOCOL IN/OUT commands.

A logical disk/LUN on the host system may be configured for encryption through the host system encryption agent in collaboration with the key manager. The entire logical disk/LUN or a partition on the logical disk/LUN may be selected for encryption. The host system (e.g., the host system KMIP client) may configure the logical disk/LUN for encryption. The host system and/or the key manager (e.g., the KMIP server) may select a key (or multiple keys) that will be used to encrypt the logical disk/LUN. The key manager may generate, create, build, etc., a KMIP-server custom attribute of the key object (e.g., the actual key) that corresponds to the key that is selected for use. Encryption map information (e.g., portions of the encryption map discussed above) may be embedded in the attribute value of the custom attribute. For example, the custom attribute may be named y-LunEncMap. The value of the custom attribute y-LunEncMap may include one or more of a logical disk/LUN identifier (which may be referred to as a unique LUN ID), a start sector/offset (which may be referred to as a Start Sector no.), a length, an initialization vector, (which may be referred to as IV), and an I/O direction. An example of a custom attribute and its corresponding value may be as follows: y-LunEncMap-<unique LUN ID>:<Start Sector no>:<Length>:<IV>:<IO direction>.

The key manager may associate the custom attribute with the key object of the key (selected for the logical disk/LUN or the partition on the logical disk/LUN). The custom attribute may be provided to the storage array (which may act as a KMIP client), as an attribute update to the key object through the standard KMIP interfaces. For example, the storage array (e.g., the storage array KMIP client) may poll the key manager (e.g., the KMIP server) to determine whether there are updates to the key object (which may include the custom attribute). In another example, the key manager may notify the storage array that the custom attribute has been created and associated with the key object and may provide the key object (with the custom attribute) to the storage array. The storage array (e.g., the storage array KMIP client) may detect the custom attribute and may process/analyze the attribute value (of the custom attribute). The storage array may extract the encryption map information for the logical disk/LUN or the partition on the logical disk/LUN from the attribute and/or attribute value. The storage array may apply the key to the logical disk/LUN or the partition on the logical disk/LUN from this point forward, and may acknowledge the application of the key (to the logical disk/LUN or the partition on the logical disk/LUN) to the key manager (e.g., the KMIP server). Upon acknowledgement, the key manager may notify the host system encryption agent (e.g., the host system KMIP client) to allow access to the logical disk/LUN or the partition on the logical disk/LUN using the selected key. After notifying the host system encryption agent, the host system and the storage array may use standard SCSI commands to access the logical disk/LUN. For example, the host system and the storage array may user standard SCSI commands to read and/or write data to the logical disk/LUN and/or the storage array.

Figure 7:
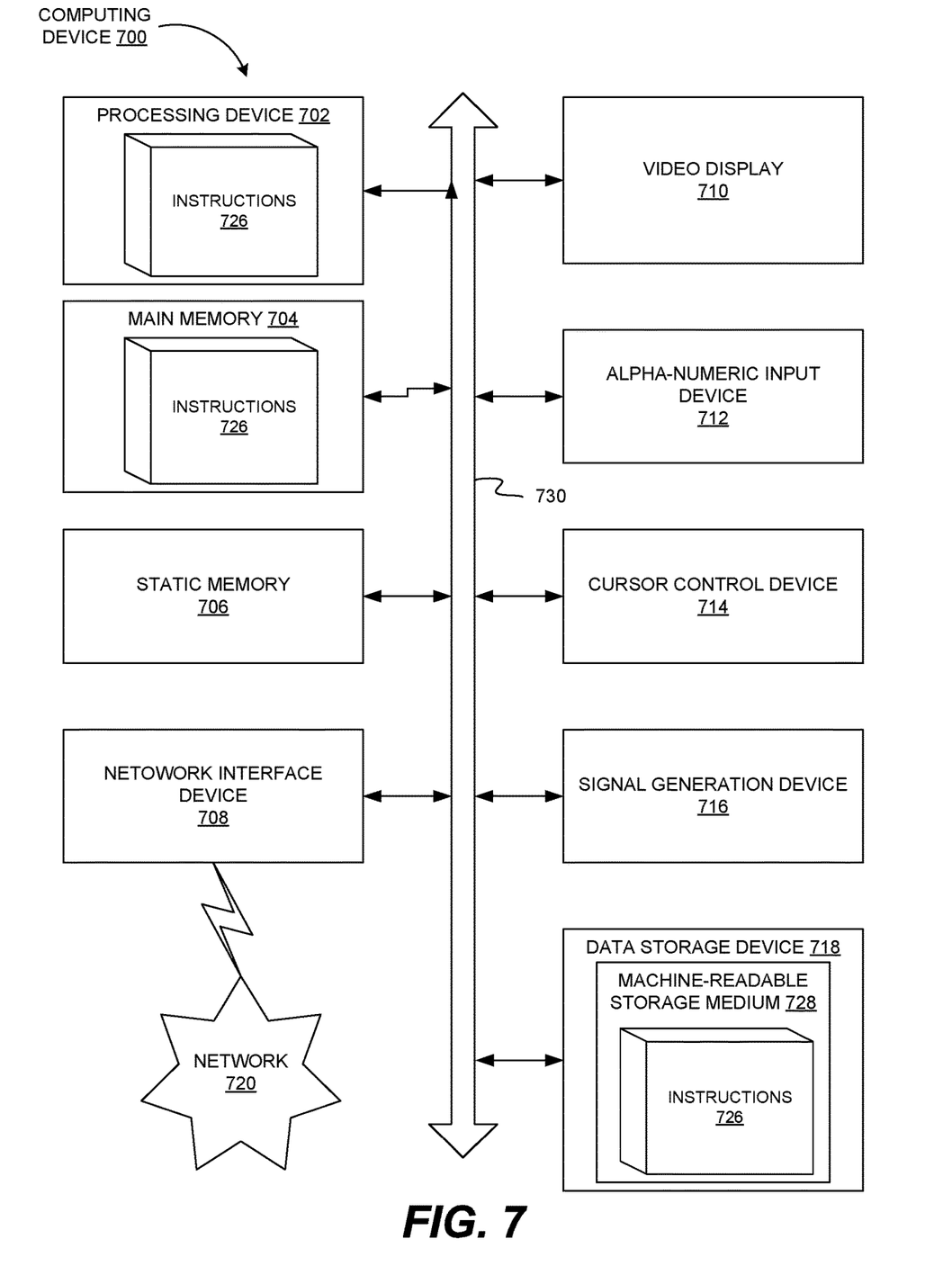
FIG. 7 is a block diagram of an example computing device that may perform one or more of the operations described herein, in accordance with some embodiments of the present disclosure.

FIG. 7 is a block diagram of an example computing device 700 that may perform one or more of the operations described herein in accordance with some embodiments. Computing device 700 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 700 may include a processing device (e.g., a general purpose processor, a PLD, etc.) 702, a main memory 704 (e.g., synchronous dynamic random access memory (DRAM), read-only memory (ROM)), a static memory 706 (e.g., flash memory and a data storage device 718), which may communicate with each other via a bus 730.

Processing device 702 may be provided by one or more general-purpose processing devices such as a microprocessor, central processing unit, or the like. In an illustrative example, processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 702 may also comprise one or more special-purpose processing devices such as an application specific integrated circuit (ASIC), a field programmable gate array (FPGA), a digital signal processor (DSP), network processor, or the like. The processing device 702 may be configured to execute the operations, methods, and/or functions operations described herein, in accordance with one or more aspects of the present disclosure, for performing the operations and steps discussed herein.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Data storage device 718 may include a computer-readable storage medium 728 on which may be stored one or more sets of instructions, e.g., instructions 726 for carrying out the operations, methods, and/or functions described herein, in accordance with one or more aspects of the present disclosure. Instructions 726 may also reside, completely or at least partially, within main memory 704 and/or within processing device 702 during execution thereof by computing device 700, main memory 704 and processing device 702 also constituting computer-readable media. The instructions 726 may further be transmitted or received over a network 720 via network interface device 708. In one embodiment, the instructions 726 may be instructions for encryption agents and/or encryption key managers/key vaults (as illustrated in FIGS. 1-6).

While computer-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "encrypting," "decrypting," "transmitting," "receiving," "changing," "rotating," "combining," "determining," "updating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions. The machine-readable medium may be referred to as a non-transitory machine-readable medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Also, the terms "first," "second," "third," "fourth," etc., as used herein are meant as labels to distinguish among different elements and may not necessarily have an ordinal meaning according to their numerical designation. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

receiving data to be written to a logical disk, generating an encryption table indicating one or more locations on the logical disk for storing the data and indicating a key used for encrypting the data;

encrypting the data to be written to the logical disk for producing encrypted data;

transmitting, from a host system to a storage array, a write request comprising the encrypted data and the encryption table; and executing the write request by the storage array only when the storage array previously receives, from the host system:

a first command indicating that an encryption agent of the host system is activated, and a second command notifying the encryption agent to coordinate and synchronize said encrypting with said storage array to secure said encrypted data during said transmitting, thereby allowing the storage array to perform the steps of decrypting the encrypted data received from the host, prior to compressing the data in said storage array, and therafter encrypting the data in said storage array after said compressing.

2. The method of claim 1, wherein generating an encryption table comprises:

providing an opaque key identtfiier, a start offset, a cipher to encrypt the data, and an initial vector.

3. The method of claim 1, further comprising:
notifying, by the host system, the storage array that the encryption agent of the host system is deactivated; and
responsive to the notifying, blocking, by the storage array, any write request received subsequently from the host system.

4. The method of claim 1, wherein generating an encryption table comprises:
transmitting the encryption table to the storage array within a payload of a SCSI security protocol out (SPOUT) command.

5. The method of claim 1, wherein generating an encryption table comprises:
generating an attribute of a key object associated with the key.

6. A tangible, non-transitory, computer-readable media having instructions thereupon which, when executed by a processor, cause the processor to perform a method comprising:
receiving data to be written to a logical disk;
generating an encryption table indicating one or more locations on the logical disk for storing the data and indicating a key used for encrypting the data;
encrypting the data to be written to the logical disk for producing encrypted data;
transmitting, from a host system to a storage array, a write request comprising the encrypted data and the encryption table; and
executing the write request by the storage array only when the storage array previously receives, from the host system:
a first command indicating that an encryption agent of the host system is activated, and
a second command notifying the encryption agent to coordinate and synchronize said encrypting with said storage array to secure said encrypted data during said transmitting,
thereby allowing the storage array to perform the steps of decrypting the encrypted data received from the host, prior to
compressing the data in said storage array, and therafter encrypting the data in said storage array after said compressing.

7. The computer readable media of claim 6, wherein generating an encryption table comprises:
providing an opaque key identifier start offset, a cipher to encrypt the data, and an initial vector.

8. The computer readable media of claim further comprising:
notifying, by the host system, the storage array that the encryption agent of the host system is deactivated; and
responsive to the notifying, blocking, by the storage array, any write request received subsequently from the host system.

9. The computer readable media of claim 6, wherein generating an encryption table comprises:
transmitting the encryption table to the storage array within a payload of a SCSI security protocol out (SPOUT) command.

10. The computer readable media of claim 6, wherein generating an encryption table comprises:
generating an attribute of a key object associated with the key.

11. The method of claim 1, further comprising:
transmitting by the host system the write request to the storage array only after receipt of a response indicating the storage array is notified that the encryption agent is active.

12. The computer readable media of claim 6, wherein the host system is configured to transmit the write request to the storage array only after receipt of a response indicating the storage array is notified that the encryption agent is active.

* * * * *